United States Patent
Tsukamoto

(10) Patent No.: US 9,829,959 B2
(45) Date of Patent: Nov. 28, 2017

(54) METHOD AND APPARATUS FOR CONTROLLING STANDBY POWER

(75) Inventor: Yasumichi Tsukamoto, Kanagawa-ken (JP)

(73) Assignee: Lenovo (Singapore) Pte. Ltd., Singapore (SG)

(*) Notice: Subject to any disclaimer, the term of this patent is extended or adjusted under 35 U.S.C. 154(b) by 389 days.

(21) Appl. No.: 13/094,926

(22) Filed: Apr. 27, 2011

(65) Prior Publication Data

US 2011/0264942 A1    Oct. 27, 2011

(30) Foreign Application Priority Data

Apr. 27, 2010   (JP) .................................. 2010-101651

(51) Int. Cl.
  *G06F 1/32*   (2006.01)
  *G06F 1/26*   (2006.01)

(52) U.S. Cl.
  CPC ............ *G06F 1/3287* (2013.01); *G06F 1/266* (2013.01); *G06F 1/3212* (2013.01); *G06F 1/3215* (2013.01); *G06F 1/3278* (2013.01); *Y02B 60/126* (2013.01); *Y02B 60/1282* (2013.01); *Y02B 60/1292* (2013.01); *Y02B 60/32* (2013.01)

(58) Field of Classification Search
  CPC ...... G06F 1/3287; G06F 1/266; G06F 1/3212; G06F 1/3215; G06F 1/3278
  See application file for complete search history.

(56) References Cited

U.S. PATENT DOCUMENTS

| | | | | |
|---|---|---|---|---|
| 6,760,850 | B1* | 7/2004 | Atkinson et al. | 713/320 |
| 8,230,243 | B2* | 7/2012 | Fujiwara | 713/310 |
| 2005/0246472 | A1* | 11/2005 | Croyle | 710/305 |
| 2006/0035527 | A1* | 2/2006 | Numano | 439/668 |
| 2007/0156942 | A1* | 7/2007 | Gough | 710/302 |
| 2007/0260358 | A1* | 11/2007 | Katoh | 700/286 |
| 2008/0309292 | A1* | 12/2008 | Van Der Velden | 320/157 |

(Continued)

FOREIGN PATENT DOCUMENTS

| | | |
|---|---|---|
| CN | 101639724 A | 2/2010 |
| JP | H11-045546 | 2/1999 |

(Continued)

*Primary Examiner* — Thomas Lee
*Assistant Examiner* — Vincent Chang
(74) *Attorney, Agent, or Firm* — Ference & Associates LLC

(57) ABSTRACT

Reducing standby power of an information apparatus is described. In one aspect, a laptop PC is equipped with an Ethernet controller. The laptop PC operates in an intermittent manner and a DC/DC converter supplies power to the Ethernet controller. The laptop PC determines whether the Ethernet controller is connected to a network by a cable in a time Twake during which the converter is on. When it is determined that the Ethernet controller is connected, the laptop PC maintains operation of the DC/DC converter until the Ethernet controller is disconnected. When it is determined that the Ethernet controller is not connected, the laptop PC stops operation of the DC/DC converter during a time Tsleep and resumes the operation thereof when a setting time by a timer elapses. The DC/DC converter supplies power to the Ethernet controller when it is actually connected to the network. Other aspects are described.

17 Claims, 4 Drawing Sheets

(56) References Cited

U.S. PATENT DOCUMENTS

| | | | | |
|---|---|---|---|---|
| 2009/0271644 A1* | 10/2009 | Fiebrich | .................. | G06F 1/266 |
| | | | | 713/320 |
| 2009/0292849 A1* | 11/2009 | Khoo | .................... | G06F 13/385 |
| | | | | 710/301 |
| 2010/0115147 A1* | 5/2010 | Kim | ................................ | 710/14 |
| 2010/0218028 A1* | 8/2010 | Yu | ........................... | H04L 12/10 |
| | | | | 713/340 |
| 2011/0158209 A1* | 6/2011 | Lundsgaard | ............ | H04L 67/24 |
| | | | | 370/338 |

FOREIGN PATENT DOCUMENTS

| | | |
|---|---|---|
| JP | 2004-192350 | 7/2004 |
| JP | 2006-053748 | 2/2006 |
| JP | 2008-207421 | 9/2008 |
| JP | 2008-225766 | 9/2008 |
| JP | 2009-199297 | 9/2009 |
| JP | 2009-278288 | 11/2009 |
| JP | 2010-033519 | 2/2010 |

* cited by examiner

METHOD AND APPARATUS FOR CONTROLLING STANDBY POWER

CLAIM FOR PRIORITY

This application claims priority from Japanese Patent Application No. 2010-101651, filed on Apr. 27, 2010, and which is fully incorporated by reference as if fully set forth herein.

FIELD OF THE INVENTION

The subject matter described herein relates to controlling standby power for an information apparatus, and particularly to reducing standby power for a information apparatus without degrading its function when an external device is connected to the computing device.

BACKGROUND

In recent years, environmental regulations imposed on electrical appliances such as information apparatuses (for example, laptop personal computers) have become stricter. The EuP Directive (Directive on Eco-Design of Energy-using Products) was established and put into effect in the EU member countries. According to the EuP Directive, information technology equipment is required, by the year 2013, not to consume power exceeding 0.5 W in a standby mode and an OFF mode while the equipment is connected to the commercial power supply. A laptop personal computer (it will be hereinafter referred to as "laptop PC") has an on-board battery pack, operates on the power supplied from the battery pack while being operated outside the office, and operates on the power supplied from the commercial power source through an AC/DC adapter while being operated inside the office.

When an AC/DC adapter is connected to a laptop PC equipped with a battery pack, the AC/DC adapter simultaneously supplies charging power for the battery pack and power for operating the system. The laptop PC, even in a power-off state, needs to supply a part of devices therein with a specific amount of power. The laptop PC, in the power-off state, provides different services or functions between a state in which the AC/DC adapter is connected (it will be hereinafter referred to as "AC power supply") and a state in which the AC/DC adapter is not connected (it will be hereinafter referred to as "DC power supply").

When the laptop PC is in the power-off state on DC power supply, the power consumption can be small. This is because the supply of power is limited to that required only for those circuits necessary for use in restart, so that the battery consumption may be prevented as much as possible. However, when the laptop PC is in the power-off state on AC power supply, the power consumption must increase because various services must be provided. First of all, a circuit that operates to monitor the state of the battery and to charge the battery must consume power because a battery charger is activated and charges the battery pack when needed even in the power-off state.

Next, when a Wake-On-LAN (WOL) function for remotely starting the laptop PC is enabled, a circuit that operates to receive a startup packet and to start the laptop PC must consume power. In addition, when charging of a USB device connected to the laptop PC is supported in the power-off state, a circuit operative for charging the USB device consumes power. Further, for the purpose of providing user-friendliness, power is also consumed by a circuit operative for displaying a connection state of the AC/DC adapter, a charging state of the battery pack, a power state, and the like, and by a circuit operative for starting the laptop PC in compliance with the power state. For this reason, the laptop PC tends to consume a relatively large amount of power even when it is in the power-off state on AC power supply.

Japanese Patent Application Laid-Open No. 2004-192350 discloses a method for reducing standby power when a computer device equipped with a battery is shut off while being connected to AC power. According to the charging method disclosed in the document, when power is turned off while the device is connected to the AC power, a so-called M power supply system that realizes a charging function is temporarily turned off and turned on thereafter when a predetermined time counted by a timer elapses, and the charging condition of the battery is checked. If it is determined that charging is necessary, the battery is charged up, and the M power supply system is turned off again. The document also describes that, when the device is turned off while being connected to the AC power, unnecessary devices connected to the M power supply system and a wakeup function are turned off by settings implemented by software.

Japanese Patent Application Laid-Open No. 2009-278288 describes when a LAN cable connected to a server is connected to an Ethernet (controller, a CPU automatically recognizes the server, and saves a user from performing an operation to make the CPU recognize the server. The same document also discloses that, when the Ethernet controller detects that the LAN cable is connected to a LAN jack, the CPU is interrupted and notified of this fact.

Japanese Patent Application Laid-Open No. 2010-33519 discloses a printer with a plurality of interfaces (I/Fs) including a USB interface and is capable of automatically changing the I/F by detecting the connection of a USB cable. The same document describes that, when the printer is connected to a host computer through a USB cable, a USB connection detector of the printer detects that the USB cable is connected by sensing a change of the potential of Vbus.

Japanese Patent Application Laid-Open No. 2009-199297 describes that when PCIe slots connected to a PCIe-PCIe bridge are all detected as not being mounted with cards, a DC/DC converter provided for exclusive use of the PCIe-PCIe bridge is controlled so as to stop supply of power to the PCIe-PCIe bridge.

In the method of Japanese Patent Application Laid-Open No. 2004-192350, since the M power supply system is operated to supply power to the circuit for monitoring the charging state of the battery when the predetermined time elapses after turning of the power off, it might be possible to reduce the standby power for a period during which the M power supply system is not in operation. However, there is a case where the M power supply system cannot be stopped when the M power supply system is operated to serve as a power supply for the other services. Particularly, according to a specific program for electric power saving, the ENERGY STAR program for electrical appliances promoted by the United States Environmental Protection Agency, business' computers must have the WOL function enabled in principle. In addition, depending on the business, users are required to always enable the WOL function. In such a case, the M power supply system is unable to be stopped according to adoption of the method of Japanese Patent Application Laid-Open No. 2004-192350. ENERGY STAR is a registered trademark of the U.S. Environmental Protection Agency in the United States.

Further, if it is necessary to support charging of any USB device connected to a laptop PC in a power-off state, the M power supply system cannot be turned off unless another new power supply circuit different from the M power supply system is provided. Consequently, it is not possible either to reduce the standby power on AC power supply to a level fulfilling the requirements under the EuP Directive or to charge the USB device only by the method of Japanese Patent Application Laid-Open No. 2004-192350. Since the operating system (OS) and device drivers are not operating in the power-off state, it is not easy to determine whether or not an operation of the M power supply system is necessary. Therefore, it is necessary to adopt special measures.

BRIEF SUMMARY

One aspect provides an apparatus comprising: an internal device configured for detecting a connection or disconnection of an external device while power is supplied to the internal device; and a controller, in the power off state, configured for: controlling power supplied to the internal device; providing power to the internal device, responsive to the connection of the external device; and stopping power to the internal device for a pre-determined time, responsive to the disconnection of the external device.

Another aspect provides a method comprising: supplying power to an internal device from a power supply; switching an apparatus to a power-off state; supplying power to the internal device from the apparatus in the power-off state; detecting, by the internal device receiving power, a connection or disconnection of an external device; maintaining, by the apparatus, the power supplied to the internal device when the internal device detects the connection of the external device; and stopping for a predetermined period, by the apparatus, the power supplied to the internal device when the internal device detects the disconnection of the external device.

A further aspect provides a system comprising: an internal device operable from a power source and connectable to an external device; a detector configured to receive power from the power source and to detect a connection of an external device to the internal device; and a controller configured to: operate while in a power-off state of the system; control a supply of power from the power source; maintain power responsive to connection of the external device; and stop power to the internal device responsive to a determination of no connection of the external device.

The foregoing is a summary and thus may contain simplifications, generalizations, and omissions of detail; consequently, those skilled in the art will appreciate that the summary is illustrative only and is not intended to be in any way limiting.

For a better understanding of the embodiments, together with other and further features and advantages thereof, reference is made to the following description, taken in conjunction with the accompanying drawings. The scope of the invention will be pointed out in the appended claims.

DETAILED DESCRIPTION

Figure 1:
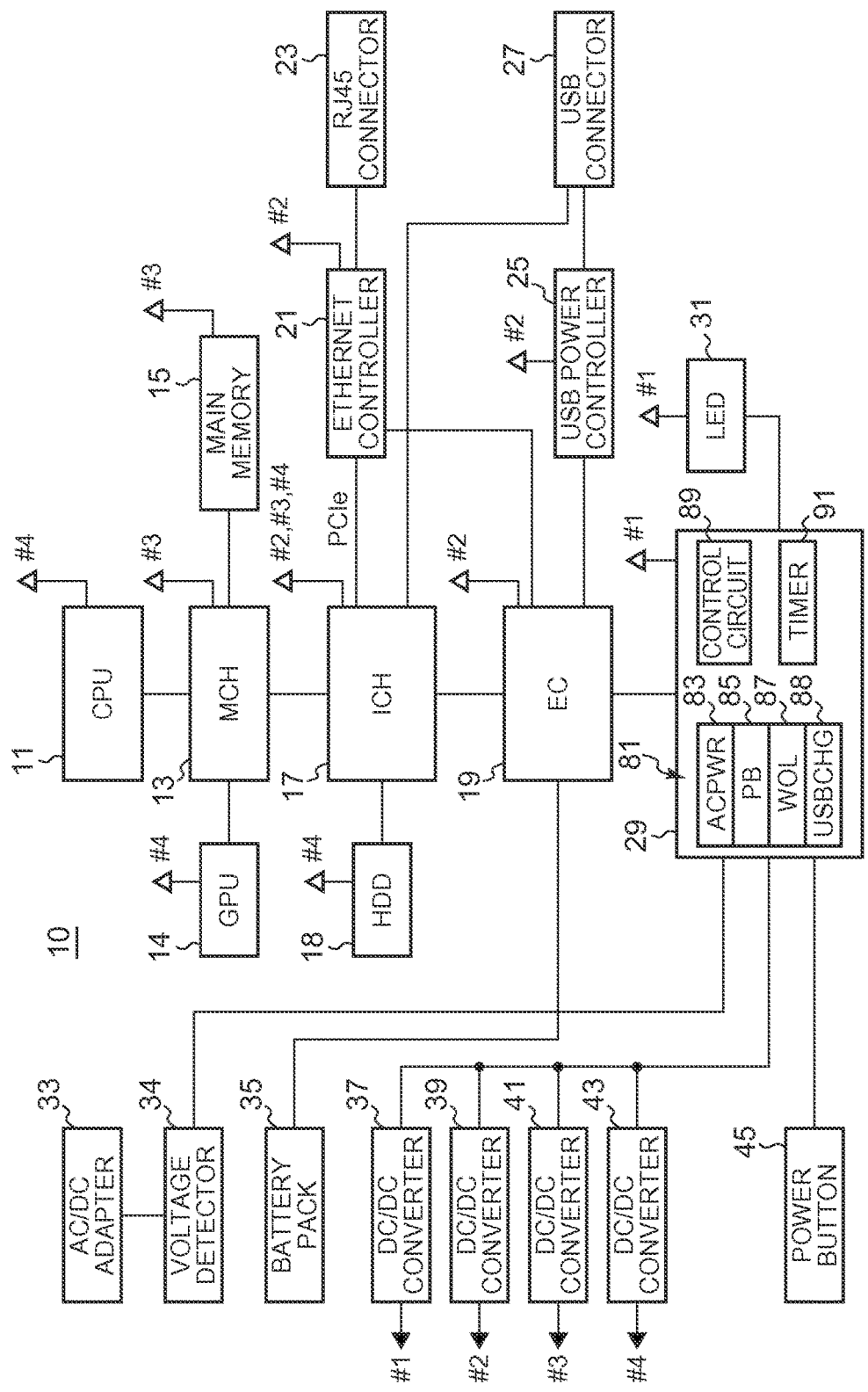
FIG. 1 illustrates an overall structure of a laptop PC.

It will be readily understood that the components of the embodiments, as generally described and illustrated in the figures herein, may be arranged and designed in a wide variety of different configurations in addition to the described example embodiments. Thus, the following more detailed description of the example embodiments, as represented in the figures, is not intended to limit the scope of the claims, but is merely representative of example embodiments.

Reference throughout this specification to "one embodiment" or "an embodiment" or the like means that a particular feature, structure, or characteristic described in connection with the embodiment is included in at least one embodiment. Thus, appearances of the phrases "in one embodiment" or "in an embodiment" or the like in various places throughout this specification are not necessarily all referring to the same embodiment.

Furthermore, the described features, structures, or characteristics may be combined in any suitable manner in one or more embodiments. In the following description, numerous specific details are provided to give a thorough understanding of example embodiments. One skilled in the relevant art will recognize, however, that aspects can be practiced without one or more of the specific details, or with other methods, components, materials, et cetera. In other instances, well-known structures, materials, or operations are not shown or described in detail to avoid obfuscation. It will be readily understood that the methods, systems, computer program products, and apparatuses described in detail herein simply represent example implementations and use contexts, and that the embodiments are equally applicable to other implementations and use contexts.

Embodiments provide for an information apparatus capable of reducing standby power in the off state without degrading services.

Further embodiments provide for an information apparatus capable of reducing standby power in the off state when the WOL function is enabled.

Other embodiments provide for an information apparatus capable of reducing standby power in the off state when USB charging of connected devices is enabled.

Embodiments provide for a power controlling method and a power controlling system for an information apparatus.

Embodiments provide for an information apparatus in the power off state capable of reducing power received from a commercial power supply. An external device or devices can be connected to the information apparatus by a connector or the like. When the external device is connected, the information apparatus, in the power-off state, can provide a predetermined function or service by an operation of an internal device. Accordingly, the information apparatus in the power-off state does not stop its power consumption completely but consumes standby power by the operation of the internal device. According to the power states of the Advanced Configuration and Power Interface ("ACPI"), the power-off state can be classified into an S5 state and an S4 state. Here, there is a case where the external device is connected or not connected to the information apparatus. When the external device is not connected, the internal device does not need to offer the predetermined function or service.

Embodiments provide that a controller can maintain or stop supply of power to the internal device in the power-off state. When the internal device receives the supply of power, the internal device can recognize connection or disconnection of the external device; the controller maintains the supply of power to the internal device when the internal device recognizes the connection of the external device; and the controller stops the supply of power to the internal device for a predetermined period when the internal device recognizes the disconnection of the external device. Consequently, when the internal device recognizes the disconnection of the external device, reduction in the consumption of the standby power can be achieved by the internal device for the predetermined period. Once the supply of power to the internal device is stopped, supply of power to the internal device can commence after elapse of the predetermined period.

Embodiments provide that when the internal device recognizes the connection of the external device, the internal device operates, by which degradation of the service or the function required in the power-off state is not caused. Power can be supplied from a power source such as a DC/DC converter to the internal device. The controller controls the operation of the power source to thereby control supply of power to the internal device. The power source can be configured to supply power to a charging circuit of a Wake-On-LAN circuit or a USB device related to the service offered in the power-off state.

Embodiments provide that the internal device may be configured to recognize a change of connection from the connection to the disconnection of the external device while supply of power is maintained. Therefore, even when the external device is disconnected after the controller functions to maintain supply of power to the internal device, the controller can stop the supply of power to the internal device and achieve reduction of standby power effectively. Here, it is possible to use the internal device as a network controller and the external device as a network device.

Embodiments provide that if the internal device is a network controller, it is possible to recognize connection or disconnection of the network device based on autonegotiation before connection is established. If the network controller is provided with a PCI-Express interface, the controller can recognize connection or disconnection of the external device based on a CLKREQ# signal outputted from the network controller. It is also possible to use the internal device as a USB power controller and the external device as a USB device equipped with a battery. In this case, the USB power controller can recognize connection or disconnection of the USB device based on an amount of charging current supplied to the USB device. As a result, even if the USB device is connected, it is possible to achieve a reduction in the standby power through stopping of the USB power controller when charging is not actually needed.

Embodiments provide an information apparatus capable of reducing standby power in the power-off state without degrading services. Other embodiments provide an information apparatus capable of reducing standby power in the power off state when the WOL function is enabled. Still other embodiments provide an information apparatus capable of reducing standby power in the power off state while still charging a USB device. Embodiments provide a power controlling method and a power controlling system for an information apparatus.

Figure 2:
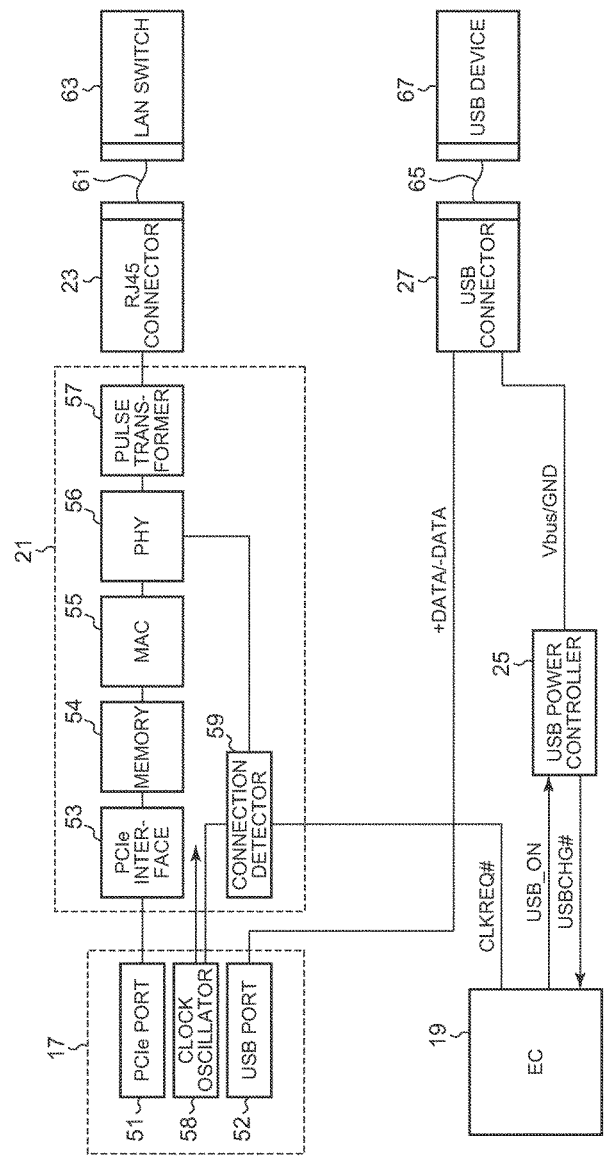
FIG. 2 illustrates a circuit arrangement capable of detecting connection of a LAN switch or a USB device.

FIG. 1 illustrates a configuration of a laptop PC 10 according to the embodiment. FIG. 2 illustrates a circuit arrangement for detecting connection of a LAN switch 63 or a USB device 67. A CPU 11 is connected to a Memory Controller Hub (MCH) 13 to which a Graphics Processing Unit (GPU) 14, a main memory 15, and an I/O Control Hub (ICH) 17 are connected. The I/O Control Hub (ICH) is also referred to as Platform Controller Hub (PCH). The ICH 17 performs a process of data transfer with respect to peripheral input and output devices. The ICH 17 is provided with interfaces for Universal Serial Bus (USB), Serial AT Attachment (SATA), Serial Peripheral Interface (SPI) bus, Peripheral Component Interconnect (PCI) bus, PCI-Express (PCIe) bus, Low Pin Count (LPC) bus, and so on, and can be connected to devices compatible with these interfaces.

Referring to now to FIG. 1, a Hard Disk Drive (HDD) 18 is connected to a SATA port of the ICH 17; an Ethernet controller 21 is connected to a PCIe port; a USB connector 27 is connected to a USB port; and an Embedded Controller (EC) 19 is connected to an LPC port. The ICH 17 also includes a register for setting the WOL function either to enable or disable. When the WOL function is set to enable in the register by a user through BIOS or OS, and the Ethernet controller 21 receives a magic packet while the power is off, the ICH 17 shifts the laptop PC 10 to a power-on state through the EC 19.

The EC 19 is a microcomputer comprising a CPU, a ROM, a RAM, etc. of 8 to 16 bits, and is provided with a plurality of channels of A/D input terminals, D/A output terminals, a timer, and digital input and output terminals. The EC 19 operates independently from the CPU 11, controls power supplied to the devices equipped in the laptop PC 10 in compliance with a power state, controls temperature inside the system casing by a heat exhausting fan (not illustrated), and so on.

Referring to FIG. 2, the Ethernet controller 21 is configured by including a PCIe interface 53, a memory 54, a Media Access Control (MAC) unit 55, a Physical (PHY) unit 56, a pulse transformer 57, and a connection detector 59. The PCIe interface 53 is connected to a PCIe port 51 by a lane comprising four signal lines in total as bi-directional lines of transmission and reception, and controls packet transfer to and from the CPU 11. The memory 54 includes a buffer for transmission and reception for storing a packet therein. The MAC unit 55 controls a packet through encoding and decoding of MAC frames, generation of preamble, selection of receiving frames, and the like, and further supports collision detection, the WOL function, etc. The PHY unit 56 is provided with a transmission and reception portion and performs two-way conversion between digital data and electric signals.

The pulse transformer 57 electrically insulates the inside and the outside of the Ethernet controller 21 from each other. An RJ45 connector 23 is an 8-pin modular-type connector for connecting a UTP cable 61 and is provided in the laptop PC 10. A LAN switch 63 is connected to the RJ45 connector 23 through an Unshielded Twisted Pair (UTP) cable 61. The LAN switch 63 is a network device referred to as a layer 2 switch or a layer 3 switch.

The PHY unit 56 starts autonegotiation with the LAN switch 63 when power is supplied to the Ethernet controller 21 while the LAN switch 63 to which power is supplied is connected to the RJ45 connector by the UTP cable 61. Alternatively, the PHY unit 56 starts autonegotiation when it is connected, by the UTP cable 61, to the LAN switch 63 to which power is supplied while power is supplied to the Ethernet controller 21. The autonegotiation is a function for setting an appropriate interface between the Ethernet controller 21 and the LAN switch 63 based on the individual transmission rates and types of communication specific thereto before a link (connection) is established therebetween.

In one non-limiting example of an embodiment, it can be preliminarily assumed that power is constantly supplied to the LAN switch 63. Accordingly, the description is based on the assumption that the autonegotiation in embodiments starts either when power is supplied to the Ethernet controller 21 while the UTP cable 61 is connected to the RJ45 connector 23 or when the UTP cable 61 is connected to the RJ45 connector while power is supplied to the Ethernet controller 21.

When power is supplied to the Ethernet controller 21, the PHY unit 56 continues to feed out a Fast Link Pulse (FLP) regardless of the connection of the UTP cable 61. The autonegotiation starts when the LAN switch 63 sends back the FLP in response. The PHY unit 56 can recognize that it is actually connected to a network when the PHY unit 56 receives the pulse in response from the LAN switch 63 by which the autonegotiation completes.

The Ethernet controller 21 periodically feeds out the FLP even after the connection is established and keeps checking whether no data is present or the UTP cable 61 is disconnected even when there are no packets to be transmitted or received. Then, once the UTP cable 61 is disconnected, the autonegotiation is started thereafter when the UTP cable 61 is connected again.

When the PHY unit 56 recognizes that the autonegotiation has been successful which has been performed while power was being supplied to the Ethernet controller 21 or when the UTP cable 61 is disconnected and connected while power continues to be supplied to the Ethernet controller 21, the PHY unit 56 transmits, to the connection detector 59, a connection signal indicating that the LAN switch 63 is connected to the RJ45 connector 23. To state it differently, the connection signal represents a state in which a network side from the RJ45 connector 23 is available for communication with the LAN switch 63. Here, the PHY unit 56 can establish connection with a LAN switch that does not support autonegotiation and output the connection signal by receiving a Normal Link Pulse (NLP) from the LAN switch after sending the FLP.

The PHY unit 56 can also be configured to output the connection signal that not only represents a signal indicating that the UTP cable 61 is connected but also represents a signal indicating that the UTP cable 61 is not connected. When the WOL function is set as being enabled in the register of the ICH 17, it is necessary to conduct supply of power to the Ethernet controller 21 while the apparatus is being turned off and keep waiting for a magic packet to be transmitted from the network. However, when the LAN switch 63 is not actually connected to the RJ45 connector 23, there is no possibility that the Ethernet controller 21 receives the magic packet. In this case, therefore, the WOL function is not substantially degraded even if the operation of the Ethernet controller 21 is stopped. The connection detector 59 outputs the connection signal received from the PHY unit 56 to a clock oscillator 58 of the ICH 17 and a digital input of the EC 19.

The clock oscillator 58 feeds a reference clock (REFCLK) to the Ethernet controller 21. Here, it is possible to assume that the connection signal is a signal (CLKREQ# signal) requesting the reference signal by the Ethernet controller 21 from the clock oscillator 58. When the Ethernet controller 21, while operating in a power save mode by stopping an internal PLL, turns to a normal mode, it outputs the CLKREQ# signal to the clock oscillator 58. The CLKREQ# signal is a signal having a low level when the reference clock is requested and a high level when the reference clock is not needed. When the reference clock stops, the PLL inside the Ethernet controller 21 stops functioning. An IC chip having a type number 82577LM of Intel Corporation is one non-limiting example of an Ethernet controller that outputs the CLKREQ# signal when the UTP cable 61 is connected to the RJ45 connector 23.

The detection by the Ethernet controller of the connection or the disconnection of the UTP cable in embodiments is not limited to the method using the autonegotiation function, but may also be achieved by another method in which connection to a network device is detected in an environment when the system is in a power-off state and the CPU 11 does not execute the device drivers or OS. In one non-limiting example, it is also possible that Ethernet controller automatically outputs a pulse signal when power is supplied thereto, and detects the presence or absence of the connection based on an electrical difference between a pulse signal that is outputted when a network device is connected and a pulse signal that is outputted when the network device is not connected.

A USB port 52 of the ICH 17 is connected to the USB connector 27 by a pair of differential type data lines (±DATA). A USB power controller 25 is connected to the digital terminal of the EC 19 by a USB_ON line and a USBCHG# signal line. The USB power controller 25 is connected to the USB connector 27 by a Vbus line and a GND line. The USB device 67 is connected to the USB connector 27 by a USB cable 65. The USB connector 27 is in the casing of the laptop PC 10.

The USB power controller 25 supplies power to the USB device 67 that is in operation and has a charging function of charging a battery mounted on the USB device 67. The EC 19 can set or refer to a USBCHG bit 88 (see FIG. 1) that indicates whether or not the laptop PC 10 in a power-off state providing a function of charging the USB device 67 connected to the USB connector 27.

When the USBCHG bit 88 is set, the EC 19 operates the USB controller 25 through a USB_ON line even in the power-off state. When the USBCHG bit 88 is not set, the EC 19 operates the USB power controller 25 only in the power-on state and a suspended state. The USB power controller 25 is provided a function of charging the USB device 67 and can output the USBCHG# signal to the digital terminal of the EC 19 when the charging current is not less than a predetermined value or when it is less than the predetermined value. The USBCHG# signal corresponds to a signal indicating whether the USB device 67 is connected to or disconnected from the USB connector 27, or a signal indicating whether actual charging is necessary or not at that moment when the USB device 67 is connected to the USB connector 27.

Accordingly, even if the USBCHG bit 88 is set, the EC 19 can stop the USB power controller 25 by recognizing that the USB device 67 is not connected to the USB connector 27, in the power-off state, based on the USBCHG# signal, or recognizing that actual charging of the USB device 67 is not necessary even if the USB device 67 is connected to the USB connector 27. If the EC 19 stops the function of the USB power controller 25 when there is no possibility that the USB device 67 needs charging, this does not degrade the function of the laptop PC 10, in a power-off state, to charge the USB device.

Referring back to FIG. 1, a battery pack 35 and a power control circuit 29 are connected to the EC 19 via an SM bus and an SPI bus, respectively. The battery pack 35 complies with the standards of Smart Battery System (SBS) proposed chiefly by the Intel Corporation in the United States and Duracell in the United States and serves as a power source for the laptop PC 10 when the AC/DC adapter 33 is not connected.

The battery pack 35 is charged by a charger (not illustrated) using power supplied by the AC/DC adapter 33 when the AC/DC adapter 33 is connected to the laptop PC 10. The AC/DC adapter 33 has a primary side thereof connected to the outlet of the commercial power source and a secondary side thereof connected to the casing of the laptop PC 10. The AC/DC adapter 33 may be incorporated in the casing of the laptop PC 10. The AC/DC adapter 33 can convert alternating voltage (AC voltage) into direct voltage (DC voltage) and supply power to a system device through the DC/DC converters 37 to 43, and further can supply power to the charger to thereby charge the battery pack 35. A voltage detector 34 is connected to an output of the AC/DC adapter 33. When the voltage detector 34 detects that a voltage in a predetermined range is generated on the output of the AC/DC adapter 33, the voltage detector 34 outputs a voltage detection signal ACPWR indicating this fact.

The power control circuit 29 is configured as an Application Specific Integrated Circuit (ASIC) including analog and digital circuits, and includes a register 81, a control circuit 89, and a timer 91. The voltage detector 34, the DC/DC converters 37 to 43, a power button 45, and an LED 31 are connected to the power control circuit 29. The power button 45 is located on the casing of the laptop PC 10 and used by a user for the operation to turn the power on or off.

The LED 31 displays a charging condition of the battery pack 35 when it is connected to the AC/DC adapter 33. The control circuit 89 controls the operation of the DC/DC converters 37 to 43 and controls a charging and discharging circuit of the battery pack 35 by receiving instructions from the EC 19. The register 81 includes therein an ACPWR bit 83 that is set when the voltage detection signal ACPWR is received from the voltage detector 34, a PB bit 85 that is set when the power button 45 is depressed, a WOL bit 87 that is set simultaneously when a register of the ICH 17 is set for enabling the WOL function, and the USBCHG bit 88 that indicates whether the function for charging the USB device 67 connected to the USB connector 27 is enabled or not while the laptop PC 10 is in the power-off state.

The PB bit 85 is referred to by the EC 19 for determining a type of a startup event when the laptop PC 10 is shifted to the power-on state, and reset by the power control circuit 29 after the laptop PC 10 is shifted to the power-on state. The WOL bit 87 and the USBCHG bit 88 are set in the register 81 by the EC 19 based on the instructions provided to the EC 19 by a user through the OS and the BIOS while the laptop PC 10 is in the power-on state. The timer 91 counts a time for causing the DC/DC converter to perform the intermittent operation while the laptop PC 10 is in the power-off state. The description of the intermittent operation will be provided later.

The laptop PC 10 complies with the ACPI standards and is capable of switching to four global system states including a G0 state, a G1 state, a G2 state, and a G3 state. The G0 state corresponds to an S0 state as a power state in which the CPU 11 is ready for executing an application program, and the peripheral devices perform a power saving operation based on individual specific functions although power is supplied thereto. This state is referred to as "power-on state" throughout the description of this specification. The G1 state is also called a sleeping state and includes an S3 state and an S4 state as power states.

The S3 state is also referred to as a suspend state in which power is supplied only to those devices necessary for retaining data in the main memory. The S4 state is also referred to as a hibernation state in which the content of the main memory is stored in the HDD 18, and power supplies for almost all devices are stopped. The G2 state corresponds to an S5 state as a power state in which the content of the main memory is not retained, and power supplies for almost all devices are stopped. The G3 state is also referred to as a mechanical-off state in which all power supplies of the laptop PC 10 are stopped, and no standby power is generated. In this specification, the S4 state and the S5 state are referred to as the power-off state.

The DC/DC converter operates in all the power states (S5, S4, S3, S0) except the G3 state and supplies power to the minimum number of devices that relate to displaying the state and starting-up while the power is off such as the power control circuit 29, the LED 31, a lid sensor (not illustrated) for detecting opening and closing of the casing, and so on. The DC/DC converter 37 also operates while in the power-off state (S5, S4) and the DC power is supplied with no ACPWR bit 83 being set in the register 81. The DC/DC converter 39 operates in the suspend state (S3) and in the power-on state (S0) while in a power-off state (S5, S4) with the ACPWR bit 83 being set, and supplies power to the ICH 17, the EC 19, the LAN controller 21, and the USB power controller 25.

However, the DC/DC converter 39 performs the intermittent operation according to the setting of the timer 91 while AC power is supplied in the power-off state. The description of this performance will be provided later. The DC/DC converter 41 operates in the suspend state (S3) and in the power-on state (S0), and supplies power to the ICH 17, the MCH 13, and the main memory 15. The DC/DC converter 43 operates in the power-on state (S0), and supplies power to the ICH 17, the CPU 11, the HDD 18, and so on. Since the ICH is provided with a plurality of functional blocks, power is supplied from different DC/DC converters so that individual functional blocks can operate in compliance with individual power states.

Here, the DC/DC converter 39 operates even when the laptop PC 10 is in the power-off state while the AC power is supplied with the ACPWR bit 83 is set in the register 81. The reason for this includes: the requirement for setting the WOL function to enable, charging the USB device 67 in the power-off state should be supported, and the battery pack 35 should be charged when the remaining capacity drops by monitoring the remaining capacity thereof, and so on. Since power is supplied from the DC/DC converter 39, the settings in the register 81 are retained even in the power-off state.

Another reason why the DC/DC converter 39 operates is that it should supply power to a Management Engine (ME) equipped in the ICH 17 for performing an Active Management Technology (AMT) provided by Intel Corporation. However, since the AMT is irrelevant to embodiments, it will be omitted. When the AC power is supplied in the power-off state, the DC/DC converters 37 and 39 operate. However, since DC/DC converter 37 has a small capacity and is efficient at a light load, the power consumption and the power loss are very small, and almost all the standby power of the laptop PC 10 when the AC power is supplied is caused by the operation of the DC/DC converter 39.

When the DC/DC converter 39 operates, power is supplied to a device that performs the WOL function, a device that charges the USB device 67, and a device that charges the battery pack 35, which consume the standby power. A conventional laptop PC consumes the standby power even in the case where a device for performing the WOL function has no possibility of performing the WOL function, and charging is not required for the USB device 67. In addition, as the opportunity for the DC/DC converter 39 to operate increases, the standby power resulting from the power loss thereof increases. According to one non-limiting embodiment, as described below, the standby power as an effective value or an average value is reduced by prolonging a period in which the DC/DC converter 39 stops functioning while the WOL service and the service for charging the USB device are prevented from dropping in quality.

It should be noted that FIGS. 1 and 2 merely illustrate a configuration and a relation of connection of principal hardware pieces related to this embodiment in a simplified manner for illustrating this embodiment. Therefore, many devices are used to organize the laptop PC 10 other than what have been heretofore described. However, since such devices are well known to those skilled in the art, detailed description thereof will be omitted. The scope of embodiments include such non-limiting examples as arranging a plurality of blocks illustrated in the drawings into a single integrated circuit or device or, conversely, dividing a single block into a plurality of integrated circuits or devices as long as such an arrangement is within a scope arbitrarily made by those skilled in the art. Further, a type of a bus, an interface, or the like connecting individual devices is merely one non-limiting example, and any other connection as long as such connection is within a scope chosen by those skilled in the art is included in the scope embodiments.

Figure 3:
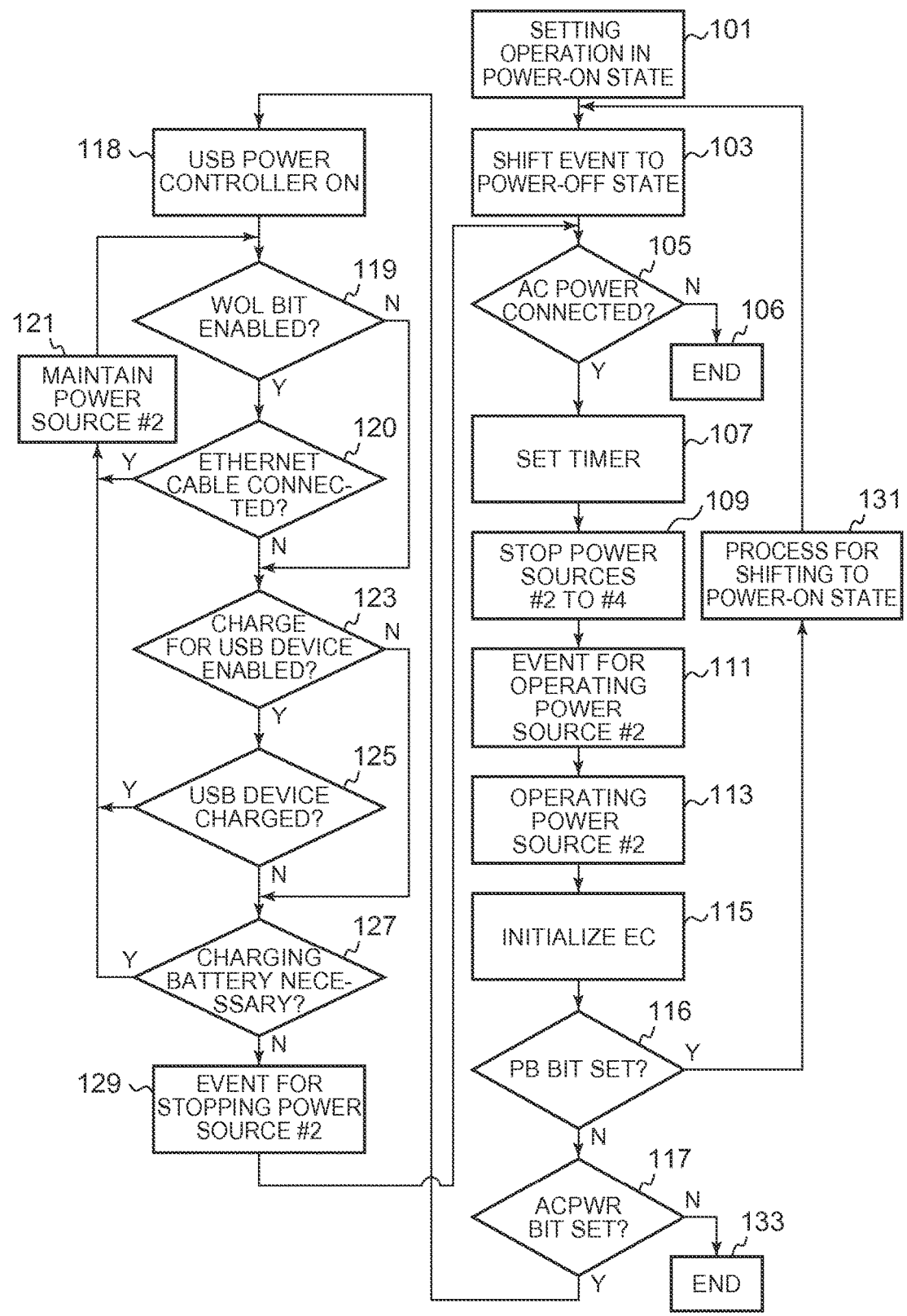
FIG. 3 is a flowchart illustrating a procedure for reducing standby power when an AC/DC adapter is connected to the laptop PC.

FIG. 3 is a flowchart illustrating a procedure for reducing standby power when the AC/DC adapter 33 is connected to the laptop PC 10 in the power-off state. In block 101, the laptop PC 10 operates in the power-on state by supply of AC power, the register of the ICH 17 is set through the OS and the BIOS to enable the WOL function, and further the WOL bit 87 is set in the register 81 of the power control circuit 29. In addition, the USBCHG bit 88 is set in the register 81 of the power control circuit 29 through the OS and the BIOS. Furthermore, the ACPWR bit 83 is set in the register 81 by the voltage detector 34. The DC/DC converters 37 to 43 are all operating and supplying power to the relevant devices.

In this procedure, the UTP cable 61 may be connected to or disconnected from the RJ45 connector 23. In addition, the USB cable 65 may be connected to or disconnected from the USB connector 27. Further, even when the USB cable 65 is connected to the USB connector 27, there is a case in which the voltage of the battery is so low that the USB device 67 requests charging, and there is a case in which the voltage of the battery is so high that no charging is necessary.

In block 103, an event for shifting the power-on state to the power-off state is generated in the laptop PC 10. The shift event to the power-off state is generated by depressing the power button 45, the operation of the lid sensor when the casing is closed, reduction of the capacity of the battery pack 35, the operation of the system when an idling time is detected, the operation to stop the OS by a user performed through a display screen, and so on. When the power button 45 is depressed, the DC/DC converters 39, 41, and 43 stop functioning while the program loaded on the main memory 15 keeps running. However, in the case of the shift event generated by other causes, the OS inquires, in advance, from each application program in execution about whether shift to the power-off state is possible or not and, in addition, writes cached data to the HDD 18.

The application program that receives, from the OS, an inquiry about shift to the power-off state displays a prompt on the display screen and waits for user's operation for storing data if the data that has not been stored is present in the main memory 15. When the OS confirms that the operation for storing data completes and shift to the power-off state is possible, the OS notifies the EC 19 through the BIOS to shift the laptop PC 10 to the power-off state. Upon receiving the notification, in block 105, the EC 19 refers to the register 81 and checks whether the ACPWR bit 83 is set or not. If the ACPWR bit 83 is not set, it indicates a state in which DC power is supplied from the battery pack 35 serving as a power source. Accordingly, in block 106, the procedure for reducing the standby power ends, and the process moves to the power-off state according to an ordinary routine. Since no special services are provided while the DC power is supplied, the DC/DC converter 39 never operates.

If the ACPWR bit 83 is set, it indicates a state in which AC power is supplied from a commercial power source. Accordingly, in block 107, the EC 19 sets and operates the timer 91. Subsequently, in block 109, the EC 19 stops the operation of DC/DC converters 39, 41, and 43 through the power control circuit 29. This means that the EC 19 temporarily stops the DC/DC converter 39 when the laptop PC 10 is shifted to the power-off state while AC power is supplied regardless of any of the following three states, i.e., the WOL bit 87 is set to enable; the USBCHG bit 88 is set to enable; and the battery pack 35 is installed.

Since power is supplied to the power control circuit 29 from the DC/DC converter 37 while power is off, the timer 91 counts a preset time. In block 111, an event to cause the DC/DC converter 39 to operate is generated in the laptop PC 10. One of the events that cause the DC/DC converter 39 to operate is generated to shift the laptop PC 10 to the power-on state. During this process, the power control circuit 29 also operates the other DC/DC converters 41 and 43 which have been stopped. Prior to the generation of this event, the WOL was not functioning since the DC/DC converter 39 is stopped in block 109. Therefore, this event is generated by depression of the power button 45.

Another event to operate the DC/DC converter is generated when the preset time of the timer 91 elapses. The preset time for the timer 91 can be chosen as an allowable time during which the Ethernet controller 21 does not detect a magic packet when the UTP cable 61 is connected and when the magic packet is transmitted to the Ethernet controller 21. Alternatively, the preset time can be decided as an allowable time required for the USB power controller 25 to start charging the USB device 67 from the time the USB cable 65 is connected.

In one non-limiting example of an embodiment, the preset time may be set to a value of a few minutes. When the elapse of the preset time of the timer 91 is confirmed, the power control circuit 29 notifies the EC 19 of this fact. The EC 19 thus notified operates, as a new operation, only the DC/DC converter 39 while the operation of the DC/DC converter 37 is kept. In block 113, when the DC/DC converter 39 is operated by an event generated when the power button 45 is depressed or when the elapse of the preset time of the timer 91 occurs, power is supplied to the Ethernet controller 21, a part of the ICH 17, the EC 19, and the USB power controller 25, resulting in consumption of the standby power.

The connection detector 59 of the Ethernet controller 21 to which power is supplied from the DC/DC converter 39 outputs, to the EC 29, a connection signal indicating that the LAN switch 63 is connected to the RJ45 connector 23 if they are connected to each other. The connection detector 59 does not output the connection signal to the EC 29 if the LAN switch 63 is not connected to the RJ45 connector 23. The USB power controller that receives power from the DC/DC converter 39 waits for the start of charging operation until the EC 19 outputs the USB_ON signal. The EC 19 that receives power from the DC/DC converter 39 initializes the RAM and each register in block 115, and thereafter checks the PB bit 85 of the power control circuit 29 in block 116.

When the PB bit 85 is set, the EC 19 determines that an event is generated by depression of the power button 45 in block 111, and the process moves to block 131 in either case of AC power supply or DC power supply. In block 131, the EC 19 operates the DC/DC converters 41 and 43, as a new operation, in addition to the DC/DC converters 37 and 39 so that the laptop PC 10 is shifted to the power-on state through the power control circuit 29. When the PB bit 85 is not set, the EC 19 determines, in block 111, that the elapse of the preset time of the timer is confirmed and an event therefrom is generated, and the process moves to block 117. In block 117, the EC 19 checks the ACPWR bit 83 of the power control circuit 29.

There may be a case where the AC/DC adapter 33 stops supplying power to the laptop PC 10 during the processes from block 107 and block 116. In block 117, the EC 19 determines that DC power is supplied when the EC 19 determines that the ACPWR bit 83 is not set, and the process moves to block 133 to complete the procedure. To state it differently, when DC power is supplied, the EC 19 does not perform the processes from block 118 to block 129 even if the preset time of the timer 91 elapses.

In block 117, when the EC 19 determines that the ACPWR bit 83 is set, it means that AC power is supplied, and the process moves to block 118. In block 118, the EC 19 recognizes that the USBCHG bit 88 is set in the register 81 and feeds out the USB_ON signal to the USB power controller 25 so that the USB power controller 25 is caused to start charging operation. When the USB device 67 is connected to the USB connector 27, the USB power controller 25 supplies charging power depending on the state of the battery voltage of the USB device 67 and simultaneously measures the charging current. The charging current is decreased as the battery is fully charged. The USB power controller 25 feeds out the USBCHG# signal to the EC 19 when the charging current exceeds a predetermined value.

In block 119, the EC 19 refers to the register 81 and determines whether the WOL bit 87 is set as being enabled or not. When the WOL bit 87 is set as being enabled, the process moves to block 120. In block 120, the EC 19 determines whether the UTP cable 61 is connected or not based on the connection signal outputted by the connection detector 59 of the Ethernet controller 21. When it is determined that the UTP cable 61 is connected, the process moves to block 121. In block 121, the EC 19 keeps the DC/DC converter 39 operating. This means that the EC 19 does not perform control to stop the DC/DC converter 39. Accordingly, the Ethernet controller 21 can receive the magic packet and perform the WOL function.

When the EC 19 determines that the WOL bit 87 is not set to enabled in block 119 or the UTP cable 61 is not connected in block 120, the process moves to block 123. If the condition in block 119 does not hold, or the condition in block 120 does not hold even if the condition in block 119 holds, it means that it is not necessary to operate the Ethernet controller 21 in the power-off state while AC power is supplied.

Since this embodiment is based on the assumption that the WOL bit 87 is set as being enabled, the condition in block 120 is met and the stopping the operation of the DC/DC converter 39 is performed. In block 123, the EC 19 determines whether or not the USBCHG bit 88 for charging of the USB device 67 is set in the power-off state. When it is confirmed that the USBCHG bit 88 is set, the process is forwarded to block 125.

In block 125, the USB power controller 25 actually supplies charging power to the USB device 67, and the EC 19 determines whether the USB power controller 25 is outputting the USBCHG# signal or not. When the USBCHG# signal is fed out, the process moves to block 121 and the EC 19 keeps the operation of the DC/DC converter 39. Namely, the EC 19 does not execute any control to stop the DC/DC converter 39. Accordingly, the USB power controller 25 can charge the USB device 27 until it is fully charged.

If the EC 19 determines that the USBCHG bit 88 is not set in the register 81 of the power control circuit 29 or that the USBCHG# signal is not outputted in block 125, then the process moves to block 127. If the condition in block 123 does not hold, or the condition in block 125 does not hold even if the condition in block 123 holds, it means that it is not necessary to operate the USB power controller 25 in the power-off state while AC power is being supplied.

Since this embodiment is based on the assumption that the USBCHG bit 88 is set to enable, the condition in block 125 is met and stopping operation of the DC/DC converter 39 is performed. The state in which the USBCHG# signal is not fed out also includes a case where the USB device 27 does not request charging even if the USB device 67 is connected to the USB connector 27. Therefore, it is possible to stop the operation of the DC/DC converter 39 more effectively based on the condition defined in block 125.

In block 127, if the battery pack 35 requests charging from the EC 19, the process moves to block 121 in which the EC 19 operates the charger while keeping the DC/DC converter 39 operating. If there is no request for charging, the EC determines that the DC/DC converter 39 can be stopped, and the process moves to block 129. Since the laptop PC 10 is in the power-off state in which it is not necessary to check the operation of an application program and a state of a cache, the EC 19 immediately starts the process of stopping the operation of the DC/DC converter 39 in block 129.

The process returns to block 105 from block 129, and the EC 19 performs the process of stopping the DC/DC converter 39 through the power control circuit 29. However, the subsequent processes are performed in the power-off state in which the DC/DC converters 41 and 43 stop functioning, and only the DC/DC converter 39 is stopped in block 109. If the process moves to a state in which DC power is supplied when the AC/DC adapter 33 is disconnected while only the DC/DC converter 39 is operating in the procedure illustrated in FIG. 3, the power control circuit 29 detects the change in the ACPWR bit 83 and notifies the EC 19 of this fact, and the EC 19 stops the DC/DC converter 39 through the control circuit 89. In the procedure illustrated in FIG. 3, portions performed by the EC 19 are actually implemented by firmware of the EC 19.

In block 121, the operation of the DC/DC converter 39 is maintained as a result of any of the conditions in blocks 120, 125, and 127 being fulfilled. The process in block 121 connects to block 119, and the EC 19 continues to determine the conditions in blocks 120, 125, and 127. When all of three conditions in blocks 120, 125, and 127 hold, the process moves to block 129 at that moment. Therefore, even if the DC/DC converter 39 is kept operating, it is possible to stop the DC/DC converter 39 when there is no need to provide the service.

Figure 4A:
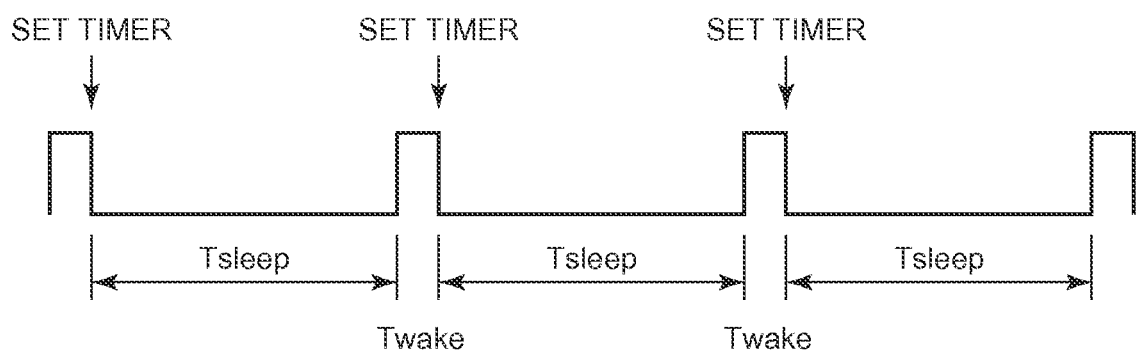
FIG. 4(*a-b*) illustrates how a DC/DC converter performs intermittent operation while power is off.
Figure 4B:
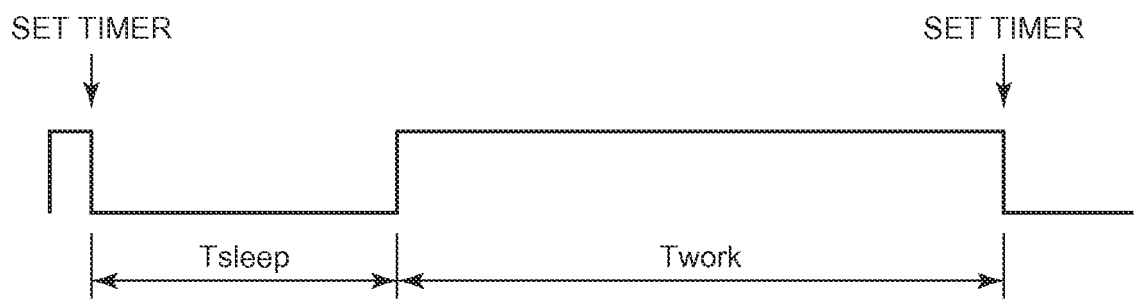

FIGS. 4A and 4B are time charts illustrating the operation of the DC/DC converter 39 while AC power is being supplied in the power-off state. FIG. 4A illustrates a state in which none of the following three wake conditions are fulfilled. They are the conditions in which the LAN switch 63 is connected to the Ethernet controller 21; the USB device 67 is connected and requests charging; and the battery pack 35 requests charging. This state corresponds to a state in the procedure in FIG. 3 in which a path from block 129 to block 105 is always available without performing the process in block 121.

The DC/DC converter 39 performs periodical intermittent operation by operating during a time Twake for checking the three wake conditions and stopping operation during a preset time Tsleep that is set by the timer 92, when none of the three conditions are fulfilled. Consequently, the effective value or the average value of the standby power consumed by the operation of the DC/DC converter 39 in this way is smaller than that by the continuous operation of the DC/DC converter 39.

FIG. 4B illustrates a state in which any one of the three wake conditions is fulfilled. A time Twork is a time during which the laptop PC 10 is providing actual services or functions while power is off, and at the same time the DC/DC converter 39 is required to operate. The time Twork corresponds to a period until the UTP cable 61 is disconnected from the RJ45 connector. Alternatively, the time Twork corresponds to either a period until the USB device 67 is disconnected from the USB connector 27 or a period until the charging current drops below a predetermined value. Further, the time Twork corresponds to a period until the battery pack 35 is fully charged up.

Conventionally, if the WOL bit 87 is set to enable, it is necessary to operate the DC/DC converter 39 even if the UTP cable 61 is not connected to the RJ45 connector. In addition, if the USBCHG bit 88 is set, it is necessary to operate the DC/DC converter 39 when the USB device 67 is not actually connected to the USB connector 27 or charging is not actually performed. For this reason, it is not conventionally possible to provide the time Tsleep.

In contrast, according to embodiments, it is arranged in such a way that power is supplied to the Ethernet controller 21 only when there is a possibility for actually providing the WOL function, and power is provided to the USB power controller 25 only when there is a possibility of requirement for charging the USB device 67. As a result, it is possible to reduce the power loss by the DC/DC converter 39, the standby power of the Ethernet controller 21, and the standby power of the USB power controller 25 during the time Tsleep. The time Twork ends when none of the three conditions are fulfilled. Once the time Twork ends, the time Twake resumes after the time Tsleep elapses.

Heretofore, the Ethernet controller and the USB power controller have been taken and described as non-limiting examples of the device that operate on AC power. However, since the method to reduce the standby power according to embodiments provides its function between the laptop PC and the external devices, it can be widely applied to such internal devices that supply power even when it is not actually necessary. Then, the method to detect the external devices by the internal devices can be implemented by an electrical method such as detecting a change of a terminal voltage on a terminal used for the connection with the external device, a change of an output resistance, or a change of a terminal current. In addition, it is also possible to provide a dedicated device for detecting connection of an external device. According to the procedure in FIG. 3, the DC/DC converter 39 cannot be stopped while power is off unless a path from block 119 through 129 is formed. The reason for this is that all of the devices that are required for execution of the WOL function, charging the USB devices, and charging the battery pack receive power from the DC/DC converter 39.

In accordance with embodiments, however, if it is allowed to complicate a switching circuit, it is also possible to provide individual switches to the Ethernet controller 21 and the USB power circuit 25 and stop power to the individual devices when conditions are individually fulfilled. In this case, even if the DC/DC converter 39 per se cannot be stopped, the standby power of the devices that are stopped by the individual switches can be reduced. In addition, referring to FIG. 1, the timer 91 is provided in the power control circuit 19 to which power is supplied from the DC/DC converter 37. However, if the EC 19 can operate in a power saving mode, it is also possible to supply power to the EC 19 from the DC/DC converter 37 in the power saving mode and use a timer of the EC 19 instead of the timer 91.

Although illustrative embodiments have been described herein with reference to the accompanying drawings, it is to be understood that the embodiments are not limited to those particular descriptions, and that various other changes and modifications may be affected therein by one skilled in the art without departing from the scope or spirit of the disclosure.

This disclosure has been presented for purposes of illustration and description but is not intended to be exhaustive or limiting. Many modifications and variations will be apparent to those of ordinary skill in the art. The embodiments were chosen and described in order to explain principles and practical application, and to enable others of ordinary skill in the art to understand the disclosure for various embodiments with various modifications as are suited to the particular use contemplated.

What is claimed is:

1. An apparatus comprising:
   in a power off state of the apparatus, an internal device that intermittently operates to reduce power off state power consumption of the apparatus, wherein the internal device detects a connection or disconnection of an external device while power is supplied to the internal device; and
   a controller that intermittently supplies power, in the power off state of the apparatus, to the internal device to reduce power off state power consumption, said controller:
   providing power to the internal device responsive to detecting the connection of the external device; and
   stopping power to the internal device for a pre-determined time responsive to detecting the disconnection of the external device.

2. The apparatus according to claim 1, further comprising a power source for supplying power to the internal device, wherein the controller controls power to the internal device by controlling the operation of the power source.

3. The apparatus of claim 2, wherein the power source supplies power to a WAKE-On-LAN circuit, a USB charging circuit, and a battery pack charging circuit.

4. The apparatus according to claim 1, wherein the internal device receives power and detects actual charging of the external device is not necessary.

5. The apparatus according to claim 1, wherein the internal device comprises a network controller, and the external device comprises a network device.

6. The apparatus according to claim 5, wherein the network controller uses autonegotiation before establishing a connection to detect connection or disconnection of the network device.

7. The apparatus according to claim 5, wherein the network controller is provided with a PCI-Express interface, and responsive to a CLKREQ# signal outputted by the network controller requesting a reference clock, the controller detects the connection or the disconnection of the external device.

8. The apparatus according to claim 1, wherein the internal device comprises a USB power controller, and the external device comprises a USB device equipped with a battery.

9. The apparatus according to claim 8, wherein, based upon the charging current supplied to the USB device, the USB power controller detects a connection or disconnection of the USB device.

10. A method comprising:
in a power off state of an apparatus, intermittently supplying power to an internal device from a power supply using a controller of the apparatus to reduce power off state power consumption of the apparatus;
detecting in the power off state of the apparatus, by the internal device receiving power, a connection or disconnection of an external device;
maintaining in the power off state of the apparatus, by a controller of the apparatus, the power supplied to the internal device when the connection of the external device is detected; and
stopping for a predetermined period in the power off state of the apparatus, by the controller of the apparatus, the power supplied to the internal device when the disconnection of the external device is detected.

11. The method according to claim 10, further comprising in response to expiration of a predetermined period, supplying power to the internal device, by the apparatus, while the apparatus is in the power-off state.

12. The method according to claim 10, further comprising, while in the power-off state, detecting whether a power supply setting is on; and responsive to the power supply setting being on, stopping the power supply to the internal device for the predetermined period.

13. The method according to claim 12, wherein the internal device is a network controller and the power supply setting comprises enabling a Wake-On-LAN function.

14. The method according to claim 13, wherein detecting the connection or disconnection includes detecting whether a connection between the network controller and the network has been established.

15. The method according to claim 12, wherein the internal device is a charging controller and the power supply setting comprises enabling the charging of an external device while the apparatus is in the power-off state.

16. The method according to claim 15, wherein detecting the connection or disconnection includes the internal device detecting an amount of charging current; and further wherein the internal device receives power and is capable of detecting actual charging of the external device is not necessary; and wherein, responsive to determining that actual charging of the external device is not necessary, power is stopped to the internal device for a pre-determined time.

17. A system comprising:
in a power off state of an apparatus, an internal device that intermittently operates to reduce power off state power consumption of the apparatus;
a detector that receives power from a power source and that detects a connection of an external device to the internal device; and
a controller, in the power off state of the apparatus, acting to:
control, in the power off state of the apparatus, a supply of power from the power source to the internal device;
maintain, in the power off state of the apparatus, power responsive to connection of the external device; and
stop, in the power off state of the apparatus, power to the internal device responsive to a determination of no connection of the external device.

* * * * *